E. KÖRTING & J. KRITZLER.
EXPLOSION PETROLEUM ENGINE.
APPLICATION FILED FEB. 15, 1906.
904,267. Patented Nov. 17, 1908.
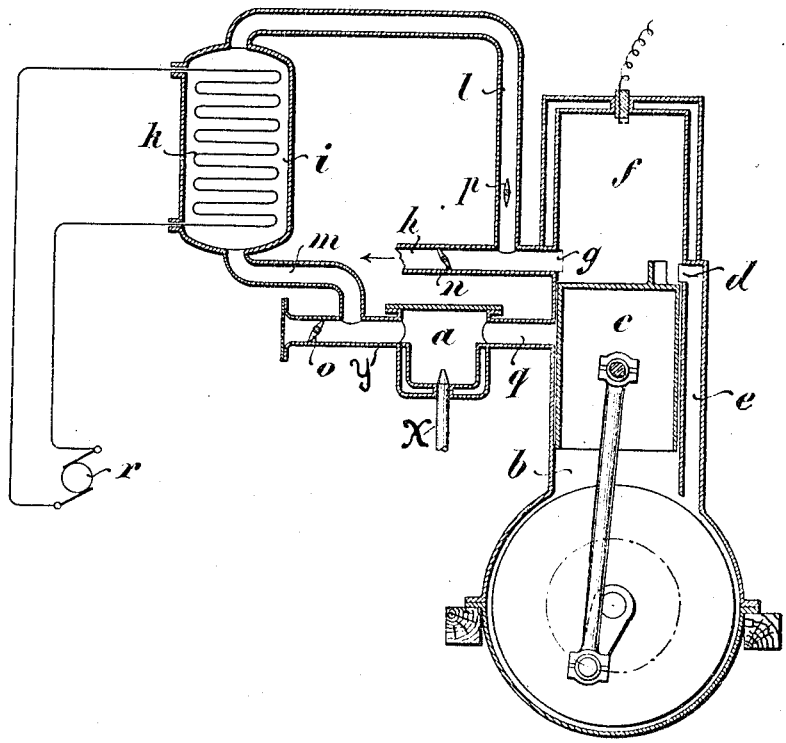

UNITED STATES PATENT OFFICE.

ERNST KÖRTING, OF LINDEN, NEAR HANOVER, AND JULIUS KRITZLER, OF KIEL, GERMANY.

EXPLOSION PETROLEUM-ENGINE.

No. 904,267.  Specification of Letters Patent.  Patented Nov. 17, 1908.

Application filed February 15, 1906. Serial No. 301,277.

*To all whom it may concern:*

Be it known that we, ERNST KÖRTING, of Linden, near Hanover, whose post-office address is No. 71 Badenstedterstrasse, Linden, near Hanover, Kingdom of Prussia, German Empire, and JULIUS KRITZLER, of Kiel, whose post-office address is No. 48 Fleethörn, Kiel, in the same Kingdom, both inventors subjects of the King of Prussia, have invented new and useful Improvements in Explosion Petroleum-Engines, of which the following is a specification.

It is known that petroleum explosion engines, whether they are operated on the four cycle principle or on the two cycle principle with compression of the combustible mixture in the combustion chamber of the engine before ignition, give no satisfactory results unless the walls of the working chambers are permanently kept at a sufficiently high temperature. For starting such petroleum engines it has been necessary to heat a portion of the combustion chamber by means of a special heating flame or to use at first in place of petroleum a combustible having a low evaporating point and to substitute therefor the petroleum after the working chambers of the engine have reached the necessary high temperature. These means are, however, in many cases impracticable, for instance in the case of the engine being used as a motor in submarine boats.

Our invention has for its object to preheat the working chambers of the petroleum engine so as to be able to start the engine directly with petroleum, by means which exclude all danger and may be operated under any ordinary conditions.

It consists in passing, before the engine is started, through the working chambers a preheated fluid such as air, steam, or other fluid adapted to act as a heat transmitter to the inner surfaces of the walls of the engine. The preheating of such fluid is carried out in a separate heating apparatus outside the engine. Any exposure to the atmosphere of the heating agency can be avoided by using an inclosed electrical heating apparatus. The preheating of the working chambers of the engine may be done more efficiently by keeping the engine during the preheating operation in motion, so that the temperature of the heat transmitter is increased by the compression of the same in the engine.

A contrivance for carrying out our invention is shown in the figure of the annexed drawing which, as an example, represents a petroleum engine operating on the two cycle principle. The combustible mixture is by the upward stroke of the piston $c$ drawn through the suction pipe $q$ from the vaporizer $a$ supplied with petroleum through pipe $x$ and with air through pipe $y$ into the crank casing $b$ and forced by the return stroke of the piston through the passage $e$ and the opening $d$ into the combustion chamber or cylinder $f$, the residue of the combustion of the preceding stroke of the piston being expelled through the opening $g$ and the exhaust pipe $h$.

In accordance with our invention, there is provided a preheater $i$ for the heat transmitting agent within which heater are located electric resistances $k$. The heater is connected at one end through a pipe $l$ with the exhaust pipe $h$ of the engine and at the opposite end it is connected through a pipe $m$ to the pipe $y$ or intake through which air is sucked into the vaporizer or gasifier $a$. The pipe $l$ is provided with a throttle valve $p$; the exhaust pipe $h$ is provided with a throttle valve $n$ placed beyond the point where the pipe $l$ opens out of the exhaust pipe, and the supply pipe $y$ is provided with a throttle valve $o$ in advance of the point where the pipe $m$ communicates with the air inlet pipe.

When the engine is to be started, the throttle valves $n$ and $o$ are closed and the throttle valve $p$ is opened, as shown in the annexed figure and no petroleum is supplied through the pipe $x$ to the gasifier $a$. With this adjustment of the valves the piston $c$ of the engine is moved back and forth by any well known means. By its upward stroke the piston $c$ sucks heated air or such other fluid as is used as a heat carrier, from the heating chamber $i$ through the pipe $m$ and the gasifier $a$ (the communication of which with the external air is shut off by the valve $o$ being closed) into the crank-casing $b$ as soon as the piston $c$ uncovers the opening of the suction pipe $q$ connecting the crank casing of the engine with the gasifier. When the piston reverses its stroke, the air filling the crank-casing $b$ is first slightly compressed therein and then passes into the combustion chamber $f$ as soon as the piston $c$ uncovers the upper opening $d$ of the passage $e$ establishing communication between the crank-casing $b$ and the combustion chamber $f$. On the following up-stroke of the piston the heated air contained in the chamber $f$ is compressed in the latter and subsequently by the reversal of the stroke, it is permitted to expand and as soon as the piston uncovers the opening $g$ of the pipe $h$, it passes from the chamber $f$ through pipe $h$ and pipe $l$ back to the heating chamber $i$. With each following stroke of the piston $c$, the same cycle of operations is repeated with the effect that a continuous current of air is caused to circulate from the heating chamber $i$ through the inner spaces of the engine in contact with their inner surfaces. If now during this circulation of the air, an electric current is caused to pass from a source of electricity $r$ through the electrical resistances $k$ provided for in the chamber $i$, heat is generated and transmitted by the current of air directly to the inner surfaces of the gasifier $a$, the crank casing $b$, the passage $e$, and the combustion or working chamber $f$ of the engine. In the latter the heating effect is increased by the fact that during the period of compression and also during the greater part of the expansion period the temperature of the heat transmitting agent is considerably higher than that of the walls of the cylinder. When the gasifier and engine are by these means raised to a sufficiently high temperature the throttle valves $n$ and $o$ are opened, the valve $p$ closed and the pipe $y$ connected with the external air and petroleum supplied through the pipe $x$ whereupon the engine works as motor.

For accelerating the heating of the engine and especially of the combustion chamber $f$, it is preferred to empty the water jacket of the cylinder and to supply the cooling water thereto only after the engine is started. I prefer to use air as the heat transmitting agent. Instead of causing the same body of air to circulate continuously through the pipe $l$ and the heater $i$, the valve $n$ may be opened and fresh air be drawn in to the heater at each stroke of the piston, the air passing from the cylinder $f$ being discharged to the atmosphere.

The advantages of our invention are obvious. The heat is transmitted directly to the inner faces of the engine cylinder where it can be given out again directly to the combustible charge, without requiring the heat to be conducted through the mass of the cylinder walls. Not only are the cylinder walls heated, but also the vaporizer and all the passages through which the combustible charge travels on its way to the cylinder, so that the same heating effect may be produced with a lower temperature of the cylinder than is necessary where the cylinder alone is heated. As a result of the foregoing, there is less loss of heat by radiation from the external surfaces of the engine. The preheating of the vaporizer aids especially in starting the vaporization of the petroleum. The ability to employ an inclosed heater prevents loss of heat, especially when the engine is exposed to the weather, and the regenerative action resulting from the closed cycle of engine and heater connections gives great heating efficiency.

Having, therefore, described our invention, we claim:

1. In an internal combustion engine, the combination with the engine cylinder, of a heating chamber, means for supplying heat to any fluid contained in said chamber, connections from said chamber to the interior of the engine cylinder, and means for causing said fluid to flow from the heating chamber to the engine cylinder and back again to the chamber.

2. In a petroleum explosion engine the combination with the engine, of a heating chamber, means for supplying said chamber with a fluid adapted to act as a heat transmitter, pipes connecting the heating chamber with the petroleum supply pipe of the engine and the exhaust pipe respectively, a valve in the intake pipe, a valve in the exhaust pipe and a valve in the pipe connecting the heating chamber with said exhaust pipe, the said valves being adapted to open and close communication between the heating chamber and the engine prior to the latter being supplied with combustible mixture, and means adapted to cause the heat transmitter to circulate from the heating chamber through the engine in contact with the inner surfaces thereof and back to the heating chamber.

3. In a petroleum explosion engine the combination with the engine of a heating chamber, an electrical heating device within said chamber, means for supplying to the said chamber a fluid adapted to act as a heat transmitter, pipes adapted to establish communication between the heating chamber and the inner spaces of the engine, valves adapted to open and close said communication prior to the engine being supplied with combustible mixture, and means adapted to cause the heat transmitter to pass from the heating chamber through the engine in contact with the inner surfaces of the same.

4. The combination with an internal combustion engine provided with the usual air and fuel inlet connections and exhaust discharge connections, of an external fluid heater provided with inlet and discharge connections, and means for putting the discharge connection of the heater in communication with the air inlet of the engine.

5. The combination with an internal combustion engine provided with the usual air and fuel inlet connections and exhaust discharge connections, of an external fluid heater provided with inlet and discharge connections, and means for putting the discharge connection of the heater in communication with the air inlet of the engine, and the exhaust connection of the engine in communication with the inlet connection of the heater.

6. The combination with an internal combustion engine and fuel gasifier therefor of an external fluid heater provided with inlet and discharge openings and means for connecting the gasifier with the discharge opening of the heater and the exhaust passages of the engine with the inlet opening of the heater.

In testimony whereof we have hereunto set our hands in presence of two subscribing witnesses.

ERNST KÖRTING.
JULIUS KRITZLER.

Witnesses:
    LEONORE RASCH,
    HERMINE GÖDECTE.